United States Patent
Zhan et al.

(10) Patent No.: US 12,516,021 B2
(45) Date of Patent: Jan. 6, 2026

(54) METHOD FOR PREPARING BRIVARACETAM AND INTERMEDIATE THEREOF

(71) Applicants: Shanghai SynCores Technologies Inc. Ltd., Shanghai (CN); ZHEJIANG HUAHAI PHARMACEUTICAL CO., LTD, Zhejiang (CN)

(72) Inventors: Yipeng Zhan, Shanghai (CN); Haisheng Fan, Shanghai (CN); Kai Yin, Shanghai (CN); Xiang Ji, Shanghai (CN); Boyang Liu, Shanghai (CN); Xiaowen Guo, Shanghai (CN); Luning Huang, Shanghai (CN); Anping Tao, Shanghai (CN); Jianguo An, Shanghai (CN); Hong Gu, Shanghai (CN)

(73) Assignees: Shanghai SynCores Technologies Inc. Ltd., Shanghai (CN); Zhejiang Huahai Pharmaceutical Co., Ltd, Zhejiang (CN)

( * ) Notice: Subject to any disclaimer, the term of this patent is extended or adjusted under 35 U.S.C. 154(b) by 621 days.

(21) Appl. No.: 17/922,140

(22) PCT Filed: Apr. 30, 2020

(86) PCT No.: PCT/CN2020/088275
§ 371 (c)(1),
(2) Date: Oct. 28, 2022

(87) PCT Pub. No.: WO2021/217579
PCT Pub. Date: Nov. 4, 2021

(65) Prior Publication Data
US 2023/0174478 A1    Jun. 8, 2023

(51) Int. Cl.
*C07D 207/27*    (2006.01)
(52) U.S. Cl.
CPC ................. *C07D 207/27* (2013.01)
(58) Field of Classification Search
CPC ................. C07D 207/27; C07B 2200/07
See application file for complete search history.

(56) References Cited

U.S. PATENT DOCUMENTS

2006/0020022 A1* 1/2006 Chekal ............. A61P 43/00
                                                      549/403

FOREIGN PATENT DOCUMENTS

| CN | 105646319 A | 6/2016 |
|---|---|---|
| CN | 106748950 A | 5/2017 |
| JP | 2004182670 A | 7/2004 |
| WO | 2016075082 A1 | 5/2016 |
| WO | 2018141276 A1 | 8/2018 |

OTHER PUBLICATIONS

English Machine Translation by google of CN 106748950, pub. 0531/2017, p. 1-10 (Year: 2017).*
International Search Report/Written Opinion dated Jan. 4, 2021 in related/corresponding PCT Application No. PCT/CN2020/088275, including partial English translation.
Office Action in corresponding/related Indian Application No. 202227067570 dated Mar. 29, 2023.

* cited by examiner

*Primary Examiner* — Adam C Milligan
*Assistant Examiner* — Karen Cheng
(74) *Attorney, Agent, or Firm* — PATENT PORTFOLIO BUILDERS PLLC

(57) ABSTRACT

Disclosed is a method for preparing a brivaracetam intermediate shown in formula B—R, comprising: reacting a compound shown in formula B—P and a resolving agent to prepare a compound shown in formula B-Q; and converting the compound shown in formula B-Q into the brivaracetam intermediate shown in formula B—R, wherein the resolving agent is a (1S,2S)-(+)-1,2-diaminocyclohexane compound. Also provided is a method for preparing brivaracetam. According to the method, a mixture of two diastereoisomers of(S)-2-3-propylpyrrolidine-1-yl butyric acid can be conveniently and effectively resolved, and the use of a chiral HPLC column is avoided, thereby greatly shortening the process time, simplifying the operation, reducing the process cost, and facilitating industrial production and environmental protection.

19 Claims, No Drawings

METHOD FOR PREPARING BRIVARACETAM AND INTERMEDIATE THEREOF

FIELD OF THE INVENTION

The present invention relates to methods for preparing brivaracetam and intermediate thereof, which belongs to the field of medical technology.

BACKGROUND OF THE INVENTION

Brivaracetam, having a chemical name of(S)-2-(R)-3-propylpyrrolidine-1-yl butyramide, was developed by UCB Pharma, Belgian, which is an analogue of the antiepileptic drug levetiracetam with the carbon atom at 4-position of pyrrolidine linked to n-propyl. Brivaracetam is also a ligand with selectivity and high affinity for cerebral synaptic vesicle glycoprotein 2a (SV2A), an important site for inhibiting partial seizures of epilepsy. The European Medicines Agency (EMA) and the US Food and Drug Administration (FDA) approved brivaracetam as an adjunctive therapy drug for the treatment of partial seizures with or without secondary generalized seizures of epilepsy patients of 16-year-old and above on Jan. 14, 2016 and Feb. 18, 2016, respectively, under the trade name Briviact®. The drug is a derivative of levetiracetam and belongs to the 3rd generation of antiepileptic drug.

At present, including the original drug, the existing preparation process of brivaracetam almost inevitably uses chiral chromatographic column to separate its diastereoisomer(S)-2-(S)-3-propylpyrrolidine-1-yl butyramide. For example, the original drug patent WO 2005028435 mentions that at a temperature of 25° C.±2° C., the chiral solid phase, and n-hexane/ethanol (45/55, V/V) as the eluent are used, and two diastereomers are separated by chromatography. WO 2007065634 discloses another synthetic route using an expensive metal catalyst RuCl$_3$, which also inevitably uses chromatographic column to obtain brivaracetam (26%, e.e. =94%) and its diastereomer. The structure of brivaracetam and its diastereomer are shown as below:

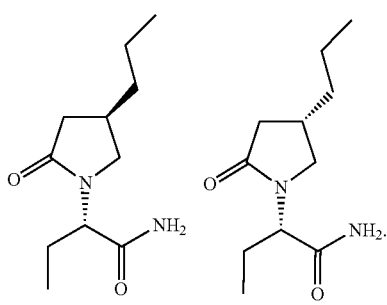

Patent document CN106748950A reports a method for preparing a brivaracetam intermediate with the following reaction route:

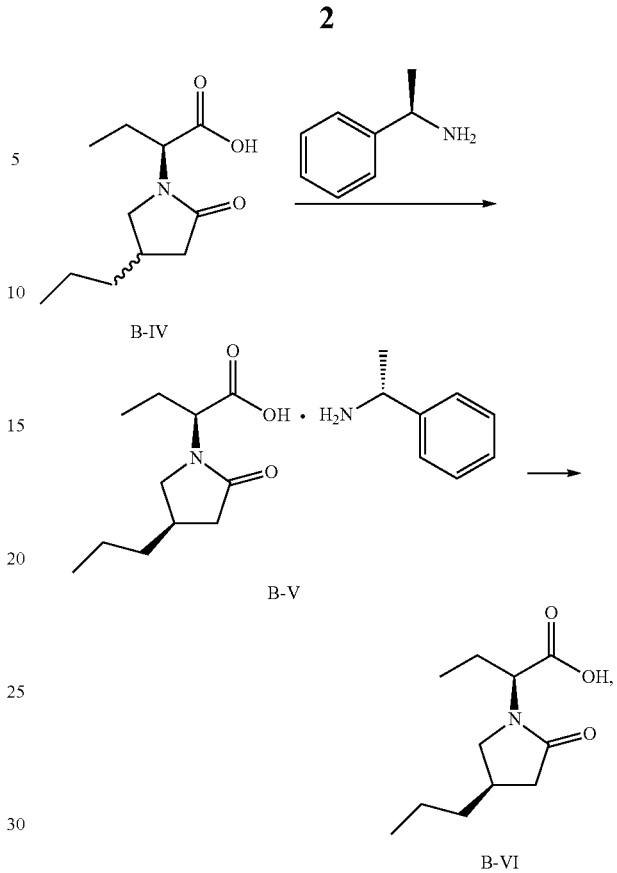

which uses an R-phenethylamine/isopropanol system to resolve the mixture of compound represented by B—IV to obtain the brivaracetam intermediate represented by B-VI. The preparation of brivaracetam from this intermediate avoids the use of chiral chromatographic column for resolving, which can reduce production cost. However, after reproducing the examples in this literature, the inventors of the present application found that the brivaracetam intermediate represented by B-VI can be obtained only with a very low yield, and the content of SS isomers is not significantly reduced. Therefore, this method has no obvious resolving and purification effect and does not have industrial applicability.

In view of high production cost and poor industrial applicability of the existing preparation method, there is an urgent need to provide a simplified and reproducible method for preparing high-purity brivaracetam for industrial production.

SUMMARY OF THE INVENTION

The object of the present invention is to provide a preparation method of a brivaracetam intermediate represented by Formula B—R, and a method for preparing high-purity brivaracetam from the intermediate.

In one aspect, the present invention provides a method for preparing a brivaracetam intermediate represented by Formula B—R, wherein the method comprises:
(1) reacting a compound represented by Formula B—P with a resolving reagent to obtain a compound represented by Formula B-Q; and
(2) converting the compound represented by Formula B-Q to the brivaracetam intermediate represented by Formula B—R;

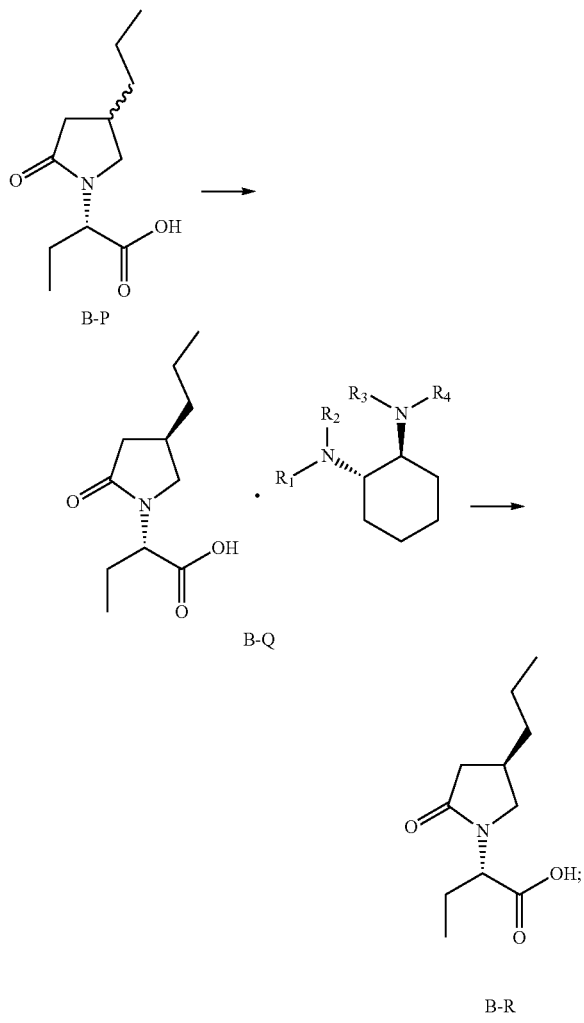

wherein the resolving reagent is a (1S,2S)-(+)-1,2-cyclohexanediamine compound having Formula (I),

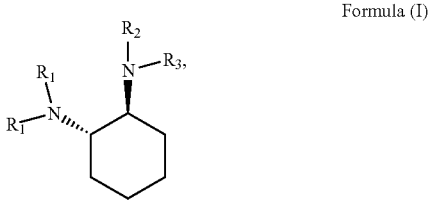

Formula (I)

wherein, in Formula (I), $R_1$, $R_2$, and $R_3$ are each independently selected from the group consisting of H, $CH_3$, and Ts, and $R_1$, $R_2$, and $R_3$ are not Ts simultaneously.

In the present invention, the compound represented by Formula B-P is a mixture of two diastereomers of (S)-2-3-propylpyrrolidine-1-yl butyric acid. Ts is p-toluenesulfonyl.

The inventors of the present application conducted an in-depth study and found that some of the resolving reagents reported in the prior art, such as R-phenethylamine and the like cannot achieve the resolving of the compound represented by B—P. However, in the process of further exploration, the inventors unexpectedly found that the specific resolving reagent as described above can effectively resolve the brivaracetam intermediate represented by Formula B—R from the compound represented by Formula B—P.

In some embodiments, the resolving reagent can be selected from the group consisting of 1S,2S-cyclohexane-diamine, 1S,2S—N,N-dimethyl-1,2-cyclohexane-diamine, (1S,2S)—N1,N1,N2,N2-tetramethylcyclohexane-1,2-diamine and N-((1S,2S)-2-(dimethylamino)cyclohexyl)-4-toluenesulfonamide, or any combination thereof.

The inventors further found that as the molar ratio of the resolving reagent to the compound represented by Formula B—P increases, the yield of the compound represented by Formula B-Q increases initially and decreases afterwards; and the chiral purity increases to a certain degree and then remains substantially constant. Taking factors of yield, chiral purity, and cost into account comprehensively, the molar ratio of the compound represented by Formula B—P to the resolving reagent should be controlled. In some embodiments, the molar ratio of the compound represented by Formula B—P to the resolving reagent is 1:0.8 to 1.5, preferably 1:1.

In above method, the step (1) can further comprise:
a. adding the compound represented by Formula B—P and the resolving reagent to a resolving solvent, dissolving the solids at a resolving temperature to obtain a clear solution, cooling the solution to crystallize, and separating crystals to obtain a solid crude product of the compound represented by Formula B-Q; and
b. recrystallizing the solid crude product in a recrystallization solvent, and separating crystals to obtain the compound represented by Formula B-Q.

In some embodiments, the resolving solvent can be selected from the group consisting of methyl tert-butyl ether (MTBE), isopropyl ether, tetrahydrofuran (THF), acetonitrile, ethyl acetate (EA), isopropyl acetate (IPAC), isopropanol and dimethyl ether (DME), or any combination thereof, preferably selected from the group consisting of isopropyl acetate, acetonitrile, ethyl acetate, and dimethyl ether, or any combination thereof.

The inventors of the present application further found that as the ratio of the volume of the resolving solvent to the mass of the compound represented by Formula B—P increases, the yield of the compound represented by Formula B-Q gradually decreases, whereas the chiral purity increases. Taking the yield and chiral purity of the compound represented by Formula B-Q into account comprehensively, in some embodiments, the ratio of the volume of the resolving solvent to the mass of the mixture of diastereomers can be 1 mL to 30 mL:1 g, preferably 1 mL to 10 mL:1 g, more preferably 3 mL to 6 mL:1 g. Within the above ratio range, the compound represented by Formula B-Q can be obtained with higher yield and chiral purity.

In some embodiments, the resolving temperature is 1° C.-100° C., preferably 50° C.-75° C.

In the step b, the recrystallization solvent can be selected from the group consisting of MTBE, acetonitrile, ethyl acetate, IPAC and DME, or any combination thereof, preferably selected from the group consisting of isopropyl acetate, acetonitrile, ethyl acetate and dimethyl ether, or any combination thereof. The compound represented by B-Q obtained by using the above recrystallization solvent has good chiral purity. In particular, when at least one of isopropyl acetate, acetonitrile, ethyl acetate and dimethyl ether is used as the recrystallization solvent, the chiral purity of the compound represented by B-Q can reach more than 99%.

In the step b, the ratio of the volume of the recrystallization solvent to the mass of the compound represented by Formula B-Q is 1 mL to 30 mL:1 g, preferably 1 mL to 10 mL:1 g, more preferably 3 mL:1 g.

In some embodiments, the separating in the method of the present invention can be achieved by filtration.

In above method, the step (2) can comprise: converting the compound represented by Formula B-Q to the brivaracetam intermediate represented by Formula B—R in a reaction solvent, in the presence of an acid.

The reaction solvent in the step (2) can be selected from the group consisting of isopropanol, ethyl acetate, isopropyl acetate and water. In particular, the reaction solvent in the step (2) can be water, or a combination of water and an organic solvent selected from the group consisting of isopropanol, ethyl acetate, and isopropyl acetate. The organic solvent can be used alone or in combination in any proportion.

The inventors of the present invention found that, by reacting the compound represented by B-Q with an acid, the compound represented by B-Q can be decomposed into the compound represented by B—R and a salt of the resolving reagent. The compound represented by B—R is insoluble in water and soluble in organic solvent, whereas the salt of the resolving reagent is dissolved in water. Based on this difference in solubility, the compound represented by B—R can be separated by the above reaction solvent.

Regarding the reaction solvent in the step (2), the reaction solvent can be only water. When the compound represented by B-Q reacts with the acid in water, the resulting salt of the resolving reagent will dissolve in the water, whereas the resulting compound represented by B—R will precipitate from the water.

When the reaction solvent comprises both water and organic solvent, the compound represented by B-Q reacts with the acid in the reaction solvent, and the resulting salt of the resolving reagent will dissolve in the aqueous phase; whereas the resulting compound represented by B—R will dissolve in the organic phase. When the organic phase is separated from the aqueous phase, the organic phase can be extracted, concentrated and dried to obtain the brivaracetam intermediate represented by B—R.

In some embodiments, the step (2) is performed in the presence of dilute hydrochloric acid, trifluoroacetic acid or a combination thereof.

In some embodiments, the step (2) is performed at pH 1-2. The pH of the reaction mixture can be adjusted to above range by using acid, which can ensure the compound represented by B-Q is reacted completely, so that the yield of the compound represented by B—R is higher.

In another aspect, the present invention provides a method for preparing brivaracetam, wherein the method comprises:
preparing the brivaracetam intermediate represented by Formula B—R according to the method described above; and
aminating the brivaracetam intermediate represented by Formula B—R to brivaracetam.

The method can avoid the use of chiral chromatographic column, shorten preparation time, simplify the operation, and reduce preparation cost.

There is no special limitation on the ammoniation process of the brivaracetam intermediate represented by B—R, and the known ammoniation reaction can be used to prepare brivaracetam. For example, the brivaracetam intermediate represented by B—R, HATU (2-(7-azabenzotriazole)-N,N,N',N'-tetramethyluronium hexafluorophoshate), ammonium chloride and diisopropylethylamine can be reacted in tetrahydrofuran to obtain brivaracetam; in which, the molar ratio of the brivaracetam intermediate represented by B—R, HATU, ammonium chloride and diisopropylethylamine is 1:1.5 to 2.5:2 to 3:2.5 to 3.5, preferably 1:2:2.5:3; and the ratio of the volume of tetrahydrofuran to the mass of the brivaracetam intermediate represented by B—R is 10 mL to 50 mL:1 g.

The brivaracetam intermediate represented by B—R can be also mixed with dichloromethane, added with an activator, and reacted with incoming ammonia gas to obtain brivaracetam. Among them, the activator can be at least one selected from the group consisting of dichlorosulfoxide, oxalyl chloride, phosphorus oxychloride, methanesulfonyl chloride, pivaloyl chloride and isobutyl chloroformate; and the reaction temperature can be −20° C. to 30° C.

On the basis of not violating the common knowledge in the art, the above embodiments and preferred conditions can be arbitrarily combined. Reagents and raw materials used in the present invention can be commercially available products or can be obtained by conventional methods in the art.

Compared with the prior art, the advantages of the method of the present invention are embodied in:
(1) the use of chiral chromatographic column for separating diastereomers can be avoided during synthesis process, which greatly shortens the process time, simplifies the operation and reduces the process cost, which is suitable for industrial production;
(2) compared with the existing R-phenethylamine resolving method, the method of the present invention has significantly better resolving and purification effect;
(3) the resolving reagent used is cheap, with high recovery rate, and can be reused.

DETAILED DESCRIPTION OF THE INVENTION

The present invention is further illustrated below by examples. The examples are only for illustrative purposes and do not limit the scope of the present invention in any aspect.

The raw materials used in the examples can be commercially available products or can be obtained by conventional methods in the art. For example, the method for preparing (S)-2-(4-propyl-1,5-dihydropyrrole-2-one) butyric acid can refer to patent CN107513031; (S)-2-3-propylpyrrolidine-1-yl butyric acid represented by Formula B—P can be prepared by palladium-carbon hydrogenation method, or can also be prepared with reference to patent CN106748950A; the method for preparing brivaracetam(S)-2-3-propylpyrrolidine-1-yl butanamide can refer to patent CN106748950A; the method for preparing 1S,2S-cyclohexanediamine can refer to patent US2009/30235; the method for preparing 1S,2S—N,N-dimethyl-1,2-cyclohexanediamine can refer to U.S. Pat. No. 4,215,114; the method for preparing (1S,2S)—N1,N1,N2,N2-tetramethyl-cyclohexane-1,2-diamine can refer to Kizirian, Jean-Claude; Caille, Jean-Claude; Alexakis, Alexandre [Tetrahedron Letters, 2003, vol. 44, #49, p. 8893-8895]; the method for preparing N-((1S,2S)-2-(dimethylamino)cyclohexyl)-4-toluenesulfonamide can refer to Chai, Zhuo; Yang, Pei-Jun [Angew. Chem., 2017, vol. 129, #2, p. 665-669, 5].

Example 1: Preparation of the Compound Represented by Formula B—P 150 g of(S)-2-(4-propyl-1,5-dihydropyrrole-2-one) butyric acid (0.71 mol, 1 eq) was added into a 2 L hydrogen autoclave, added with 1.5 L methanol and 1.5 g of Pd(OH)2/C (1%), and reacted at 20 MPa for 20 h. The reaction mixture was filtered. The filtrate was concentrated to dryness to obtain 140 g solid of the compound represented by Formula B—P.

After calculation, the ratio of two isomers in the compound represented by Formula B—P was RS configuration: SS configuration=85:15, and the chiral purity was 85%, in which RS represented the isomeric product having the RS configuration, i.e., the compound represented by Formula B—R; and SS represented the isomeric product having the SS configuration, i.e. a diastereomer of the compound represented by Formula B—R. The abbreviations in the following examples had the same meaning as in Example 1.

Example 2: Preparation of the Compound Represented by Formula B—P 150 g of(S)-2-(4-propyl-1,5-dihydropyrrole-2-one)butyric acid (0.71 mol, 1 eq) was added into a 2 L hydrogen autoclave, added with 1.5 L isopropanol and 45 g of Pd(OH)2/C (30%), and reacted at 20 MPa for 20 h. The reaction mixture was filtered. The filtrate was concentrated to dryness to obtain 145 g solid of the compound represented by Formula B—P.

After calculation, the ratio of two isomers in the compound represented by Formula B—P was RS configuration: SS configuration=54:45, and the chiral purity was 54%.

Example 3: Preparation of the Compound Represented by Formula B-Q 180 ml of ethyl acetate, 6 g of the compound represented by Formula B—P prepared in Example 1 (0.028 mol, 1 eq, containing 15% SS) and 3.2 g of 1S,2S—N,N-dimethyl-1,2-cyclohexanediamine (0.8 eq, 0.0224 mol) were added to a 500 ml three-neck flask. The mixture was stirred at about 1° C. for 1 h and then filtered by suction to obtain 10 g of solid crude product (hereinafter referred to as "wet product") of the compound represented by Formula B-Q, and then the wet product was directly added to 10 ml of ethyl acetate, which was heated to dissolve the solid in order to obtain a clear solution. The solution was slowly cooled to 20° C. over 1.5 h for crystallization, filtered by suction to obtain 8.0 g of the compound represented by Formula B-Q, yield: 94.6%, purity: 99.8%, containing 0.2% diastereomer.

Example 4: Preparation of the Compound Represented by Formula B-Q 360 ml acetonitrile, 60 g of the compound represented by Formula B—P prepared in Example 1 (0.28 mol, 1 eq, containing 15% SS) and 47.7 g of (1S,2S)—N1,N1,N2,N2-tetramethylcyclohexane-1,2-diamine (1 eq, 0.28 mol) were added to a 500 ml three-neck flask. The mixture was stirred at about 50° C. for 1 h and then filtered by suction to obtain 108 g of wet product. Then, the wet product was directly added to 300 ml of isopropanol, which was heated to dissolve, slowly cooled to 20° C. over 1.5 h, and filtered by suction to obtain 89.6 g of the compound represented by Formula B-Q, yield: 98.1%, purity: 99.8%, containing 0.2% SS.

Example 5: Preparation of the Compound Represented by Formula B-Q 60 ml isopropyl acetate, 60 g of the compound represented by Formula B—P prepared in Example 1 (0.28 mol, 1 eq, containing 15% SS) and 47.88 g of 1S,2S-cyclohexanediamine (1.5 eq, 0.42 mol) were added to a 500 ml three-neck flask. The mixture was heated to about 100° C. to obtain a clear solution. The solution was cooled to 20° C.±5° C., stirred for 1 h and then filtered by suction to obtain 100 g of wet product. Then, the wet product was directly added to 180 ml of acetonitrile, which was heated to 72° C. to dissolve, slowly cooled to 20° C. over 1.5 h, filtered by suction to obtain 73.3 g of the compound represented by Formula B-Q, yield: 94%, purity: 99.8%, containing 0.2% SS.

Example 6: Preparation of the Compound Represented by Formula B-Q 180 ml of ethylene glycol dimethyl ether, 60 g of the compound represented by Formula B—P prepared in Example 1 (0.28 mol, 1 eq, containing 15% SS) and 83 g of N-((1S,2S)-2-(dimethylamino)cyclohexyl)-4-toluenesulfonamide (1 eq, 0.28 mol) were added to a 500 ml three-neck flask. The mixture was heated to about 75° C. to obtain a clear solution. The solution was cooled, stirred for 1 h and then filtered by suction to obtain 145 g of wet product. Then, the wet product was directly added to 700 ml of IPAC, which was heated to dissolve, slowly cooled over 1.5 h, and filtered by suction to obtain 118 g of the compound represented by Formula B-Q, yield: 97.3%, purity: 99.8%, containing 0.2% SS.

Example 7: Preparation of the Compound Represented by Formula B-Q 300 ml methyl tert-butyl ether, 60 g of the compound represented by Formula B—P prepared in Example 2 (0.28 mol, 1 eq, containing 45% SS) and 39.8 g of 1S,2S—N,N-dimethyl-1,2-cyclohexanediamine (1 eq, 0.28 mol) were added to a 500 ml three-neck flask. The mixture was stirred at about 50° C. for 1 h and then filtered by suction to obtain 65 g of wet product. Then, the wet product was directly added to 60 ml of ethyl acetate, which was heated to dissolve slowly cooled to 20° C. over 1.5 h, filtered by suction to obtain 52 g of the compound represented by Formula B-Q, yield: 95%, purity: 99.5%, containing 0.5% SS.

Example 8: Preparation of the Compound Represented by Formula B-Q 60 ml isopropyl ether, 6 g of the compound represented by Formula B—P prepared in Example 2 (0.028 mol, 1 eq, containing 45% SS) and 3.98 g of 1S,2S—N,N-dimethyl-1,2-cyclohexanediamine (1 eq, 0.028 mol) were added to a 100 ml three-neck flask. The mixture was stirred at about 40° C. for 1 h and then filtered by suction to obtain 6.5 g of wet product. Then, the wet product was directly added to 60 ml of methyl tert-butyl ether, which was heated to dissolve, cooled, and filtered by suction to obtain 4.9 g of the compound represented by Formula B-Q, yield: 90%, purity: 99.5%, containing 0.5% SS.

Example 9: Preparation of the Compound Represented by Formula B-Q 18 ml tetrahydrofuran, 6 g of the compound represented by Formula B—P prepared in Example 2 (0.028 mol, 1 eq, containing 45% SS) and 3.98 g of 1S,2S—N,N-dimethyl-1,2-cyclohexanediamine (1 eq, 0.028 mol) were added to a 100 ml three-neck flask. The mixture was stirred at about 75° C. for 1 h and then filtered by suction to obtain 5 g of wet product. Then, the wet product was directly added to 120 ml of methyl tert-butyl ether, which was heated to dissolve, cooled, and filtered by suction to obtain 4.5 g of the compound represented by Formula B-Q, yield: 82%, purity: 99.5%, containing 0.5% SS.

Example 10: Preparation of the Compound Represented by Formula B-Q 180 ml isopropyl acetate (3v), 6 g of the compound represented by Formula B—P prepared in Example 2 (0.028 mol, 1 eq, containing 45% SS) and 3.18 g of 1S,2S-cyclohexanediamine (1 eq, 0.028 mol) were added to a 50 ml three-neck flask. The mixture was heated to about 72° C. to obtain a clear solution. The solution was cooled to 20° C.±5° C., stirred for 1 h and then filtered by suction to obtain 7 g of wet product. Then the wet product was directly added to 18 ml of isopropyl acetate, which was heated to dissolve, slowly cooled, and filtered by suction to obtain 4.8 g of the compound represented by Formula B-Q, yield: 95%, purity: 99.8%, containing 0.2% SS.

Example 11: Preparation of the Compound Represented by Formula B-Q 240 ml isopropyl acetate, 6 g of the compound represented by Formula B—P prepared in Example 2 (0.028 mol, 1 eq, containing 45% SS) and 3.98 g of 1S,2S—N,N-dimethyl-1,2-cyclohexanediamine (1 eq, 0.028 mol) were added to a 50 ml three-neck flask. The mixture was heated to about 72° C. to obtain a clear solution. The solution was cooled to 20° C.±5° C., stirred for 1 h and then filtered by suction to obtain 7.5 g of wet product. Then, the wet product was directly added to 18 ml of ethyl acetate, which was heated to dissolve, cooled, and filtered by suction to obtain 5.25 g of the compound represented by Formula B-Q, yield: 96%, purity: 99.8%, containing 0.2% SS.

Example 12: Preparation of the Compound Represented by Formula B—R 30 g of the compound represented by Formula B-Q prepared in any of the above examples was added to a 500 ml three-neck flask, and added with 120 ml of water and 240 ml of ethyl acetate, which was adjusted to pH 1-2 with 6N hydrochloric acid, stirred for 0.5 h and then separated. The aqueous phase was extracted with 30 ml EA. The organic phases were combined, and concentrated under reduced pressure to obtain 19.5 g white solid of the compound represented by Formula B—R, yield: 100%, purity: 99.8%.

Example 13: Preparation of the Compound Represented by Formula B—R 30 g of the compound represented by Formula B-Q prepared in any of the above examples was added to a 500 ml three-neck flask, and added with 120 ml of water, which was adjusted to pH 1-2 with 6N trifluoroacetic acid, stirred for 0.5 h and filtered to obtain 19.5 g white solid of the compound represented by Formula B—R, yield: 100%, purity: 99.8%.

Example 14: Preparation of Brivaracetam

Referring to the Example 1-(7) of patent CN10106748950A, 80 ml of tetrahydrofuran, the compound represented by Formula B—R (6.4 g, 0.03 mol), HATU (28.5 g, 0.075 mol), ammonium chloride (4.9 g, 0.09 mol), and diisopropylethylamine (11.7 g, 0.09 mol) were added into a 250 ml four-neck flask. The mixture was stirred at room temperature for 2 h, added with 80 ml of water and 160 ml of ethyl acetate, stirred, and separated. The organic phase was washed once with each of 40 ml saturated sodium bicarbonate solution, 40 ml saturated ammonium chloride solution, and 40 ml saturated saline solution, dried over anhydrous sodium sulfate, and concentrated to obtain 7 g white solid of brivaracetam, HPLC purity measured by HPLC: 99.5%, chiral purity: 99.85%.

Example 15: Resolving the Compound Represented by Formula B—P by Using 1S,2S—N,N-dimethyl-1,2-cyclohexanediamine as the Resolving Reagent 18 ml of isopropanol and 9 g of the compound represented by Formula B—P prepared in Example 2 (0.042 mol, 1 eq, containing 45% isomer) were added into a 50 ml three-neck flask, and heated to about 55° C. to obtain a solution a. 18 ml of isopropanol and 5 g of 1S,2S—N,N-dimethyl-1,2-cyclohexanediamine (0.83 eq, 0.035 mol) were added into another 50 ml three-neck flask, and stirred to dissolve to obtain a solution b. Then, the solution a was added dropwise to solution b. The mixture was stirred and heated to 70° C., then cooled and crystallized, and filtered by suction to obtain 7 g solid, yield: 86%, purity: 99.5%, containing 0.5% diastereomer.

Comparative Example: Resolving the Compound Represented by Formula B—P By Using R—(+)-a-Phenylethylamine as the Resolving Reagent 18 ml of isopropanol and 9 g of the compound represented by Formula B—P (0.042 mol, 1 eq, containing 45% isomer) were added into a 50 ml three-neck flask, and heated to about 55° C. to obtain a solution a. 18 ml of isopropanol and 4.2 g of R—(+)-a-phenylethylamine (0.83 eq, 0.035 mol) were added into another 50 ml three-neck flask, and stirred to dissolve to obtain a solution b. Then, the solution a was added dropwise to solution b. The mixture was stirred, then cooled and crystallized without solid precipitation. The resultant was concentrated to remove part of isopropanol to obtain 1 g solid, yield: 13%. The ratio of isomer RS:isomer SS was 55:45, showing no obvious resolving and purification effect.

The invention claimed is:

1. A method for preparing a brivaracetam intermediate represented by Formula B—R,

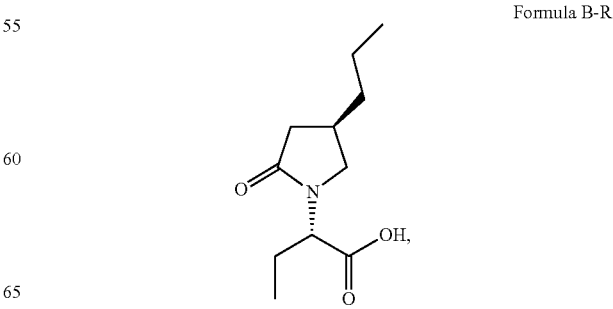

Formula B-R wherein the preparation method comprises:
(1) reacting a compound represented by Formula B—P with a resolving reagent to obtain a compound represented by Formula B-Q,

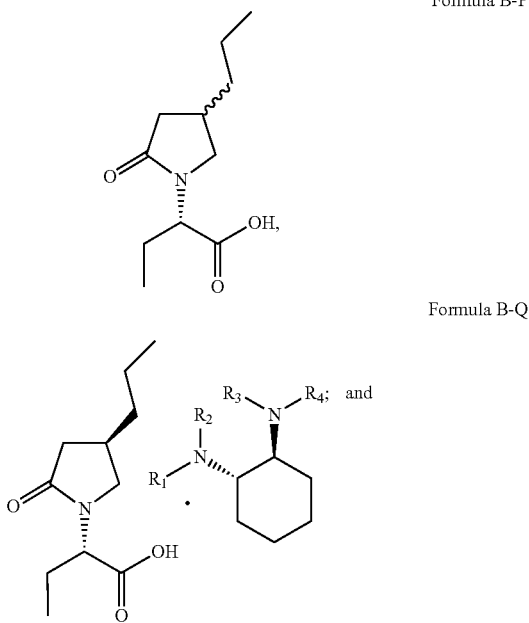

(2) converting the compound represented by Formula B-Q to the brivaracetam intermediate represented by Formula B—R;
wherein the resolving reagent is a (1S,2S)-(+)-1,2-cyclohexanediamine compound having Formula (I),

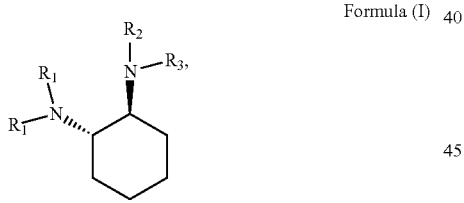

wherein, in Formula (I), $R_1$, $R_2$, and $R_5$ are each independently selected from the group consisting of H, $CH_3$, and Ts, and $R_1$, $R_2$, and $R_5$ are not Ts simultaneously.

2. The method according to claim 1, wherein the resolving reagent is selected from the group consisting of 1S,2S-cyclohexanediamine, 1S,2S—N,N-dimethyl-1,2-cyclohexanediamine, (1S,2S)—N1,N1,N2,N2-tetramethyl-cyclohexane-1,2-diamine and N-((1S,2S)-2-(dimethylamino)cyclohexyl)-4-toluenesulfonamide, or any combination thereof.

3. The method for preparing according to claim 1, wherein a molar ratio of the compound represented by Formula B—P to the resolving reagent is 1:0.8 to 1.5.

4. The method for preparing according to claim 1, wherein the step (1) comprises:
a. adding the compound represented by Formula B—P and the resolving reagent to a resolving solvent, dissolving the solids at a resolving temperature to obtain a clear solution, cooling the solution to crystallize, and separating crystals to obtain a solid crude product of the compound represented by Formula B-Q; and
b. recrystallizing the solid crude product in a recrystallization solvent, and separating crystals to obtain the compound represented by Formula B-Q.

5. The method according to claim 4, wherein the resolving solvent is selected from the group consisting of methyl tert-butyl ether (MTBE), isopropyl ether, tetrahydrofuran (THF), acetonitrile, ethyl acetate (EA), isopropyl acetate (IPAC), isopropanol and dimethyl ether (DME), or any combination thereof.

6. The method according to claim 4, wherein a ratio of a volume of the resolving solvent to a mass of the compound represented by Formula B—P is 1 mL to 30 mL:1 g.

7. The method according to claim 4, wherein the recrystallization solvent is selected from the group consisting of methyl tert-butyl ether, acetonitrile, ethyl acetate, isopropyl acetate and dimethyl ether, or any combination thereof.

8. The method according to claim 4, wherein a ratio of a volume of the recrystallization solvent to a mass of the compound represented by Formula B-Q is 1 mL to 30 mL:1 g.

9. The method according to claim 1, wherein the step (2) comprises: converting the compound represented by Formula B-Q to the brivaracetam intermediate represented by Formula B—R in a reaction solvent, in the presence of an acid.

10. The method according to claim 9, wherein the acid in the step (2) is dilute hydrochloric acid, trifluoroacetic acid or a combination thereof.

11. The method according to claim 9, wherein the reaction solvent in the step (2) is selected from the group consisting of isopropanol, ethyl acetate, isopropyl acetate and water.

12. A method for preparing brivaracetam, wherein the method comprises:
preparing the brivaracetam intermediate represented by Formula B—R according to the method of claim 1; and
aminating the brivaracetam intermediate represented by Formula B—R to brivaracetam.

13. The method according to claim 3, wherein the molar ratio of the compound represented by Formula B—P to the resolving reagent is 1:1.

14. The method according to claim 6, wherein the ratio of the volume of the resolving solvent to the mass of the compound represented by Formula B—P is 1 mL to 10 mL:1 g.

15. The method according to claim 6, wherein the ratio of the volume of the resolving solvent to the mass of the compound represented by Formula B—P is 3 mL to 6 mL:1 g.

16. The method according to claim 7, wherein the recrystallization solvent is selected from the group consisting of isopropyl acetate, acetonitrile, ethyl acetate and dimethyl ether, or any combination thereof.

17. The method according to claim 8, wherein the ratio of the volume of the recrystallization solvent to the mass of the compound represented by Formula B-Q is 1 mL to 10 mL:1 g.

18. The method according to claim 8, wherein the ratio of the volume of the recrystallization solvent to the mass of the compound represented by Formula B-Q is 3 mL: 1 g.

19. The method according to claim 4, wherein the resolving temperature is 50° C. to 75° C.

* * * * *